May 22, 1956 G. GUANELLA 2,747,083

FREQUENCY-MODULATED HIGH-FREQUENCY SYSTEM

Filed May 31, 1951

INVENTOR.
GUSTAV GUANELLA

BY [signature]

ATTORNEY.

United States Patent Office 2,747,083

Patented May 22, 1956

2,747,083

FREQUENCY-MODULATED HIGH-FREQUENCY SYSTEM

Gustav Guanella, Zurich, Switzerland, assignor, by mesne assignments, to Radio Patents Company, a partnership Application May 31, 1951, Serial No. 229,075

Claims priority, application Switzerland June 7, 1950

2 Claims. (Cl. 250—15)

Figure 1:
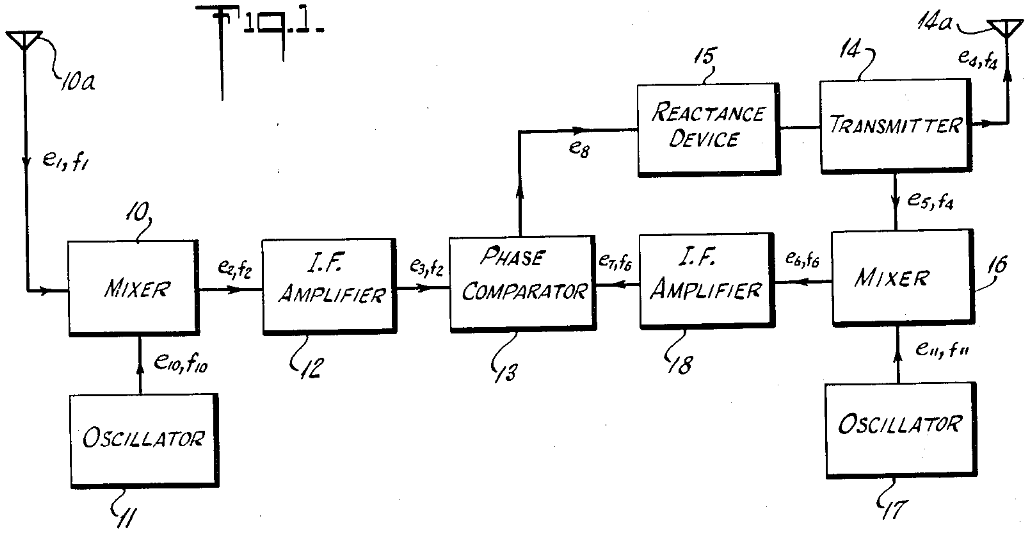

The present invention relates to a system for controlling the frequency of an oscillator in accordance with a variable frequency, such as a frequency modulated control signal, in particular for use in connection with high frequency or micro-wave radio relay stations, for converting an incoming frequency modulated signal of a given carrier frequency signal into a corresponding output signal having a different carrier frequency for re-radiation by said station.

In the transmission of directive radio beams by means of frequency-modulated micro-wave oscillations, the amplification of the received oscillations in a relay station meets with substantial difficulties. Although it is possible to demodulate the signals received by a relay station to reproduce the original modulating signal and to utilize the latter for modulating a self-excited oscillator for re-transmitting the signals from the station, substantial non-linear distortion may occur when using a system of this type, due to unavoidable non-linearities of the modulation and de-modulation characteristics when using standard modulating devices. This makes it difficult to transmit multi-channel signals using a single carrier without distortion and, in a similar manner, other wide band signals, such as television signals transmitted through a number of relay stations may be distorted to such an extent as to render such a system impractical for lack of sufficient non-linear frequency control of the micro-wave oscillator.

Some improvement may be obtained by the use of a negative feedback arrangement, by applying the transmitted signal frequency to a frequency discriminator and utilizing the output voltage of the discriminator to counteract the frequency control signal. In this manner, non-linearities of the modulating characteristic may be minimized, however, other distortion will be introduced due to non-linearity of the discriminator characteristic.

It has already been proposed to amplify the received signal in a radio relay station prior to its re-transmission by converting the signal frequency to an intermediate frequency and re-converting the latter after sufficient amplification to the desired transmission frequency. In such systems, the transmitting signal has to be amplified to the final power required for transmission. This necessitates the use of micro-wave amplifiers which, however, at the present time are difficult to produce for the required output power and, in any case, are highly complicated and expensive.

An object of the present invention is the provision of a system for controlling the transmitting frequency of a radio relay station or similar converting system by an incoming frequency modulated signal, whereby high frequency or micro-wave amplifiers are substantially dispensed with.

Another object is the provision of a system for synchronizing the transmitted frequency in a frequency modulated radio relay station, whereby a substantially constant frequency difference is maintained between the transmitted and received frequency modulated oscillations.

With the above and further objects, as will become apparent, in view, the invention involves generally the provision of a self-excited frequency modulated oscillator or generator providing sufficient transmitting power and being controlled by the output signal of a balanced phase comparator excited by a pair of relatively low frequency input frequencies to be compared and derived, respectively, from said oscillator and from the input or control signal, such as the frequency modulated input signal of a relay station through suitable frequency converters. The output voltage supplied by the phase comparator controls a suitable reactance device associated with said oscillator, to vary the oscillating frequency in such a manner as to follow the variations of the incoming signal frequency in synchronism therewith. By the proper choice of the intermediate or difference frequencies derived from both the oscillator and controlling signal frequencies, a desired frequency difference between the incoming and re-radiated signal will be maintained throughout the modulating cycle or frequency deviation from the center or carrier frequencies.

Figure 2:
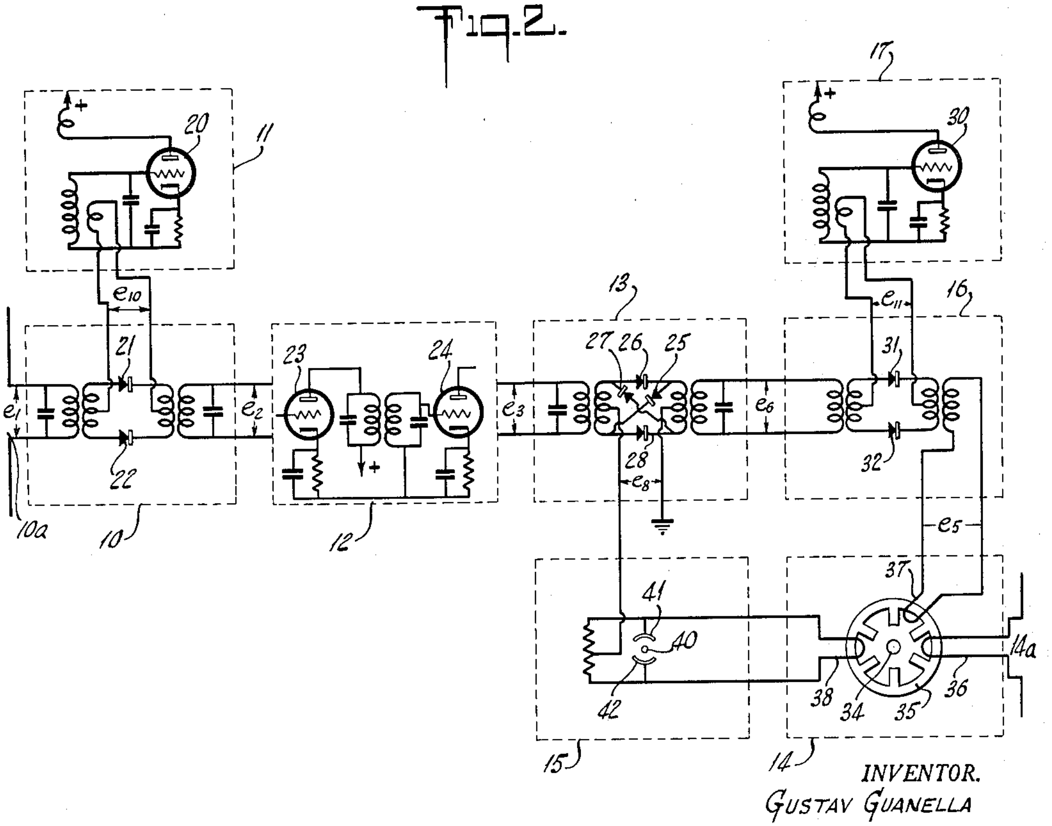

The invention will be better understood from the following description taken in reference to the accompanying drawing, forming part of this specification, and in which:

Figure 1 is a block diagram of a frequency modulated radio relay station embodying the invention; and Figure 2 is a more detailed circuit diagram of a system shown in Figure 1.

Referring more particularly to Figure 1, the frequency $f_1$ of the frequency modulated input signal $e_1$ of a radio relay station intercepted by a receiving antenna **10*a* is applied to a modulator or mixer 10 of any known type and serving as a frequency converter. For this purpose, there is applied to said mixer 10 an auxiliary signal $e_{10}$ having a constant frequency $f_{10}$ and produced by a local generator 11 such as a crystal controlled oscillator or the like. The resulting output signal $e_2$ of the mixer 10 having a substantially lower or intermediate frequency $f_2$, being equal to the difference between the frequencies $f_1$ and $f_{10}$, is amplified by means of an I. F.-amplifier 12 of known design to produce an amplified intermediate frequency signal $e_3$ which is applied to one of the inputs of a balanced phase comparator 13**.

Item 14 is a self-excited oscillator, such as a triode, magnetron, glystron, or other micro-wave oscillator, generating an output or transmitting signal $e_4$ of sufficient power and having a frequency $f_4$ differing from the input frequency $f_1$ and serving to energize a transmitting antenna **14*a*. The transmitter or oscillator 14 has associated therewith a suitable reactance device 15, such as an electronic reactance tube, able to control the oscillating frequency in accordance with the variations of a direct current controlling signal $e_8$ supplied by the output of the phase comparator 13**.

A portion of the generated energy or transmitting signal $e_5$ is applied to a further modulator or mixer 16 acting as a frequency converter in a manner similar to the mixer 10. The mixer 16 is furthermore controlled by a local oscillator 17 producing a control or beating signal $e_{11}$ having a frequency $f_{11}$. As a result, the output of the mixer 16 supplies a signal or voltage $e_6$ having a substantially lower or intermediate frequency $f_6$ equal to the difference between the frequencies $f_5$ and $f_{11}$. After sufficient amplification in the I. F.-amplifier 18, the amplified intermediate frequency signal $e_7$ is applied to the remaining input circuit of the phase comparator 13. The latter may be in the form of a push-pull or ring modulator using electronic or dry rectifiers in accordance with well known practice.

The operation of the system afore-described is as follows:

The frequency-modulated input or control signal $e_1$ of carrier or mean frequency $f_1$ being applied to the modulator or mixer 10 is converted into a signal $e_2$ of intermediate frequency by combining with the auxiliary signal $e_{10}$ of constant frequency $f_{10}$. The signal $e_2$ of intermediate frequency $f_2$ is sufficiently amplified in the I. F.-amplifier 12 to produce an amplified signal or intermediate frequency voltage $e_3$. The intermediate frequency $f_2$ is chosen in such a manner as to afford a most favorable operation of the I. F.-amplifier, i. e. to obtain a maximum amplification with a minimum of parts.

In a similar manner, a signal or voltage $e_5$ is applied from the transmitter or oscillator 14 to the modulator or mixer 16. By combination with the auxiliary signal $e_{11}$ supplied by the auxiliary oscillator 17 and having a frequency $f_{11}$ there is produced a signal or voltage $e_6$ having a difference or intermediate frequency $f_6$ in the output of the modulator 16. Signal $e_6$ is applied to the phase modulator 13 after amplification by the I. F.-amplifier 18.

The input frequencies $f_2$ and $f_6$ of the phase comparator are made equal by a proper choice of the auxiliary frequencies $f_{10}$ and $f_{11}$. As a result, the output of the phase comparator includes a direct current component of positive or negative value depending upon the relative phase position between the input voltages $e_3$ and $e_7$, the current being zero at a 90° phase relation between the voltages being compared and varying in either positive or negative direction depending upon the sense of deviation of the relative phase from the normal or 90° angle or phase balance position. The direct current control voltage $e_8$ supplied by the phase comparator is applied to the reactance device 15, which controls the frequency of the oscillator or transmitter 14. The control of the generated frequency $f_4$ by the voltage $e_8$ is such that with a deviation of the voltages $e_3$ and $e_7$ from their normal or balanced phase position, the transmitter tends to change its frequency in such a manner as to reduce said deviation. If, under this condition, the input frequency $f_1$ varies, the frequency $f_4$ of the output signal $e_4$ of the generator varies correspondingly. If the input signal $e_1$ is frequency modulated in respect to its mean frequency $f_1$, the frequency $f_4$ of the transmitter 14 will follow the frequency modulation of the input signal substantially instantaneously, since the control always acts in the sense of a minimum phase deviation from the balanced condition of the input voltages $e_3$ and $e_7$ of the phase comparator 13.

In other words, the operation of the system described is based upon a phase counter-coupling or follow-up control, insuring a practically constant and rigid frequency control or synchronization of the transmitter with the input or received signal frequency. Slight phase deviations may occur as a result of frequency-dependent variations of the characteristics of the transmission circuits or elements. These deviations are, however, in general of a negligible nature insofar as they are in a linear relation to the frequency. Non-linear phase variations which may cause non-linear distortion of the transmitted signal, are minimized by the phase balance or substantially instantaneous follow-up control of the system.

In order to insure operation of the relay station free from disturbance, the auxiliary frequencies $f_{10}$ and $f_{11}$ are so chosen that the incoming signal frequency $f_1$ and the retransmitted frequency $f_4$ differ from each other by a suitable frequency difference. If desired, however, the input and output frequencies $f_1$ and $f_4$ may be equal, in which case the same auxiliary frequency may be used for both mixers or converters 10 and 16. Such a system may serve for controlling a high power high frequency oscillator or transmitter directly by a frequency modulated input or control signal, without requiring a high-frequency amplifier.

Furthermore, the local or auxiliary frequencies $f_{10}$ and $f_{11}$ may be supplied by a single oscillator in which case a further frequency converter may be connected between this oscillator and at least one of the modulators or mixers 10 and 16, the auxiliary frequency for said further converter being such as to result in a desired frequency difference between $f_1$ and $f_4$.

It may occur in practice that the synchronized oscillator 14 falls out of step, in which case the automatic synchronization by the phase comparator ceases to function. In this case, the output of the phase comparator supplies an alternating voltage in place of a simple positive and negative direct current, said alternating voltage having a basic frequency corresponding to the difference between the input frequencies $f_2$ and $f_6$ of the balanced phase comparator. This alternating voltage may be utilized in a known manner for operating an alarm or a control device serving to operate an arrangement to restore the synchronism between the input and output signals.

By an arrangement of the type described, high-frequency transmitters or oscillators, especially those of the very high frequency or micro-wave range, may be frequency controlled or modulated by means of simple devices, without involving the difficulties encountered in the amplification of frequencies of this type to the level required for transmission.

In order to insure adequate stability, it is advisable to design the elements in the feedback loop containing the modulator 16, I. F.-amplifier 18, phase comparator 13, transmitter oscillator 14 and reactance control 15 to have as small a transit time or as wide a band width as possible. For this reason, the I. F.-amplifier 18 may be omitted entirely, as shown in Figure 2.

Referring to Figure 2, there is shown a more complete wiring diagram of a synchronized radio relay circuit of the type according to Figure 1. The receiving antenna 10*a* and transmitting antenna 14*a* are shown in the form of dipoles, the mixers or frequency converters 10 or 16 are in the form of push-pull or balanced modulators of known construction each comprising a pair of rectifiers 21, 22 and 31, 32, respectively. The auxiliary or local oscillators 11 and 17 are shown to consist of standard regenerative or feedback oscillators each comprising a triode 20 and 30, respectively. The intermediate frequency amplifier 12 is shown to be of the standard tuned type, comprising, in the example shown, two amplifier stages or tubes 23 and 24, while the phase comparator 13 shown is in the form of a standard ring modulator comprising four rectifiers 25, 26, 27, 28, connected with the input and output circuits, in the manner shown and well known in the art.

The generator 14 may be of any type, and, in the example shown, consists of a magnetron oscillator having a central cathode 34 and a multi-cavity anode 35 arranged concentrically to said cathode, in a manner well known to those skilled in the art. In addition to a suitable operating potential being applied between the cathode 34 and the anode 35, means (not shown) are provided to produce an axial magnetic field, i. e. in the direction at right angle to the plane of the paper, to result in a generation of high frequency or micro-wave oscillation by the resonating cavity, in a manner well known. There are furthermore shown three coupling loops 36, 37 and 38 for deriving energy from the resonator to energize the antenna 14*a*, the modulator mixer 16 and a reactance control device, respectively, the latter serving to control the oscillator frequency in accordance with the output voltage $e_8$ of the phase comparator 13.

The reactance control device shown, by way of example, also consists of a magnetron having a cathode 40 and a pair of split anodes 41 and 42, further means (not shown) being provided to produce an axial magnetic field, similar as in the oscillating magnetron 14. There is applied to both anodes 41 and 42 the output voltage $e_8$ of the phase comparator. In a device of this type, the electric space charge in the space between the cathode 40 and the anodes 41 and 42 depends upon the anode voltage due to the varying deflection of the electrons emitted by the cathode and travelling towards the anodes. As a result, variations in the space charge produce corresponding variations of the effective capacity of the discharge space. The electronic capacity variations depending upon the control voltage $e_8$ serve to vary the frequency of the magnetron oscillator by injecting an effective capacitative reactance into the resonating cavity of the oscillator through the coupling loop 38, provided the line or connection between the magnetron and reactance device is equal to one-half wave length or a whole number multiple thereof of the operating frequency.

By a proper adjustment and polarity connection of the control voltage $e_8$, the system will function to automatically balance the input voltage $e_3$ and $e_6$ applied to the phase comparator 13, thus resulting in an automatic follow-up or synchronization of the output frequency radiated by the antenna 14*a* with the input frequency received by the antenna 10*a*, the constant frequency difference between the received and radiated oscillation being determined by the difference between the frequencies of the auxiliary oscillators 11 and 17. The latter might be crystal controlled oscillators or of any other suitable type, such as reflex klystron oscillators, or they may be combined into a single oscillator from which a pair of control signals $e_{10}$ and $e_{11}$ are derived by frequency conversion or multiplication or in any other suitable manner, to maintain a rigid and constant difference between the received and transmitted frequencies.

It will be understood, the oscillator 14 may be of any suitable type, such as a regenerative triode oscillator and the reactance control device 15 may also be of any suitable construction such as in the form of an electronic reactance tube effectively connected to the resonant or tank circuit of the oscillator to control the oscillating frequency. The reactance tube is provided with one or more grids or control electrodes excited both by a signal derived from the oscillating frequency through a suitable quadrature phase shifting network as well as by the control voltage $e_8$ supplied by the phase comparator, to vary the effective reactance and, in turn, the oscillating frequency, in a manner well known and understood by those skilled in the art.

In the foregoing, the invention has been described with specific reference to an illustrative circuit. It will be understood, however, that variations and modifications, as well as the substitution of equivalent elements and circuits for those shown and described herein for illustration, may be made without departing from the broader scope and spirit of the invention. The specification and claims are accordingly to be regarded in an illustrative rather than in a limiting sense.

I claim:

1. A radio relay system comprising means for receiving frequency modulated signals, a self-excited oscillation generator-transmitter having a frequency differing from the unmodulated carrier frequency of said signals, means for transmitting the generated oscillations, heterodyning means including means to produce a pair of auxiliary beating oscillations having different constant frequencies for converting the received signals and a portion of the generated signal energy, respectively, to a pair of intermediate frequency signals of equal frequency, a balanced phase detector excited by said intermediate frequency signals, to produce a direct current control signal varying in either positive or negative direction from zero in response to a relative phase deviation in a corresponding sense of said intermediate frequency signals from a normally balanced position, and means responsive to said control signal and effective to control the frequency of said generator, to maintain a phase balance between said intermediate frequency signals and to thereby cause the frequency of the generated oscillations to substantially instantaneously follow the modulation frequency changes of the received signals with a constant difference equal to the frequency difference between said beating oscillations.

2. A frequency modulated system comprising a source of frequency modulated high frequency control signals, a self-excited high frequency oscillation generator-transmitter having a frequency differing from the unmodulated carrier frequency of said signals, heterodyning means including a pair of beating oscillators having different constant frequencies for converting said control signals and a portion of the generated signal energy, respectively, into a pair of intermediate frequency signals of equal frequency, a balanced phase detector excited by said intermediate frequency signals, to produce a direct current control signal varying in either positive or negative direction from zero in response to a relative phase deviation of said intermediate frequency signals in a corresponding sense from a normally balanced position, and reactance control means responsive to said control signal and effective to control the frequency of said generator, to maintain a phase balance between said intermediate frequency signals and to thereby cause the transmitted frequency to substantially instantaneously follow the modulation frequency changes of said control signals with a constant difference equal to the frequency difference of said heating oscillators.

References Cited in the file of this patent

UNITED STATES PATENTS

| | | |
|---|---|---|
| 1,731,264 | Potter | Oct. 15, 1929 |
| 1,873,842 | Hyland | Aug. 23, 1932 |
| 2,277,105 | Herzog et al. | Mar. 24, 1942 |
| 2,590,784 | Moulton | Mar. 25, 1952 |
| 2,605,425 | Hugenholtz | July 29, 1952 |
| 2,644,138 | Bond | June 30, 1953 |

FOREIGN PATENTS

| | | |
|---|---|---|
| 965,041 | France | Aug. 31, 1950 |